United States Patent [19]

Ward, Sr.

[11] 4,240,312

[45] Dec. 23, 1980

[54] APPARATUS FOR IMPROVING WEAR LIFE OF ROTARY DIE CUTTER ANVIL COVERS

[75] Inventor: William F. Ward, Sr., Hampstead, Md.

[73] Assignee: The Ward Machinery Company, Cockeysville, Md.

[21] Appl. No.: 39,131

[22] Filed: May 15, 1979

[51] Int. Cl.$^3$ .......................... B23D 25/12; B26D 1/56

[52] U.S. Cl. ........................................ 83/311; 83/338; 83/347; 83/561; 83/38

[58] Field of Search ...................... 83/37, 38, 311, 338, 83/347, 561, 493

[56] References Cited

U.S. PATENT DOCUMENTS

| | | | |
|---|---|---|---|
| 3,272,047 | 9/1966 | Ward | 83/338 |
| 3,832,926 | 9/1974 | Leaseburge et al. | 83/311 |
| 3,882,745 | 5/1975 | Garrett et al. | 83/311 |
| 3,899,945 | 8/1975 | Garrett et al. | 83/38 |
| 4,063,493 | 12/1977 | McEvers et al. | 83/347 |

*Primary Examiner*—Donald R. Schran
*Attorney, Agent, or Firm*—Boyce C. Dent

[57] ABSTRACT

A method and apparatus for extending the useful life of resilient covers on anvil rolls of rotary die cutters by causing the die cutting rules to penetrate the covers at sequential incrementally small circumferentially spaced locations around the cover by adding to the speed of rotation of the anvil roll relative to the speed of the die holder roll. Lateral reciprocation of the anvil roll is translated to rotary motion by a gear and pivot lever arrangement, such rotary motion being added to the normal speed of the anvil roll.

4 Claims, 7 Drawing Figures

APPARATUS FOR IMPROVING WEAR LIFE OF ROTARY DIE CUTTER ANVIL COVERS

BRIEF SUMMARY OF THE INVENTION

This invention is directed to a method and apparatus for improving the useful life of a resilient cover on an anvil roll for rotary die cutters. The method generally comprises rotating a die holder roll, with die cutting rules mounted thereon, at a selected speed of rotation, such as the speed of the machine; rotating an anvil roll, with a resilient cover thereon adapted for penetration by the die cutting rules, at a second rotational speed greater than the rotational speed of the die holder roll which tends to cause the cutting rules to penetrate the cover at sequential circumferentially spaced locations upon successive revolutions of the anvil roll; and adding to the speed of rotation of the anvil roll during successive rotations of the anvil roll which causes the cutting rules to actually penetrate the cover at sequential locations circumferentially spaced from the locations where the rules would tend to penetrate if additional speed was not added to the anvil roll. Speed may be added to and then subtracted from the speed of rotation of the anvil roll, by an amount greater or lesser than the difference in rotational speed between the die holder and anvil rolls, so that, when speed is added to the anvil roll, the cutting rules actually penetrate the cover at a location behind the location where the rules tend to penetrate the cover due to the first difference in speed between the rolls. When speed is subtracted from the anvil roll, the rules actually penetrate the cover ahead of the location where the rules tend to penetrate the cover. The effect of this is that actual penetration tends to walk in a pattern around the anvil cover such that at least several hundred revolutions of the anvil roll occurs before the pattern begins to repeat.

Different types of apparatus may be used to accomplish the foregoing method, the only requirement being that the apparatus be capable of adding to, subtracting from, or adding to and subtracting from the normal rotational speed of the anvil roll by a small amount so that actual penetration of the cutting rules in the cover occurs at very short circumferentially spaced locations around the circumference of the cover. For purposes herein, reference to adding to the rotational speed of the anvil roll also encompasses subtracting from the speed of the roll.

In conventional practice, the anvil roll is also reciprocated laterally along its longitudinal axis to cause the pattern of penetration to also move back and forth along the length of the roll during rotation thereof. For convenience, this lateral movement may be utilized to actuate a speed changing means associated with the anvil roll to add to the rotational speed thereof. For example, a gear may be mounted for independent rotation about a journal on the end of the anvil roll, such gear being driven by a gear fixed on a journal of the die holder roll and having one less gear tooth than the die holder roll gear so that the anvil roll would, if directly connected to its associated gear, rotate slightly faster than the die holder roll. Instead, the anvil roll is driven by a worm wheel mounted thereon, such worm wheel being driven by a gear assembly mounted to the anvil roll gear and connected to a pivot lever having one end anchored and the other end movable in response to lateral movement of the anvil roll gear so as to translate lateral motion to rotary motion for adding rotational speed to the worm wheel and, hence, to the anvil roll. Since the anvil roll reciprocates, the pivot lever adds speed to the worm wheel as the anvil roll reciprocates in one direction and subtracts speed as the anvil roll reciprocates in the opposite direction.

BRIEF DESCRIPTION OF THE DRAWINGS

In the drawings wherein like parts are marked alike.

DESCRIPTION OF THE PREFERRED EMBODIMENT

Figure 1:
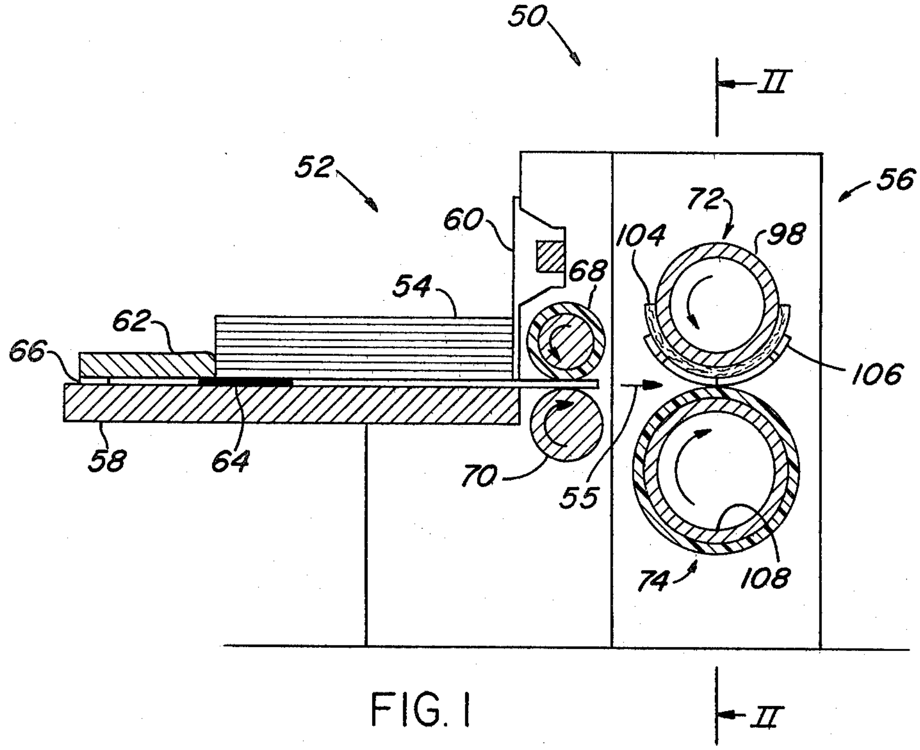
FIG. 1 is a diagrammatic illustration in side elevation of a die cutting machine of the type to which this invention applies.

The method of the present invention generally comprises the steps of rotating a die holder roll, with die cutting rules mounted thereon, at a selected rotational speed, such as the speed of the rotary die cutter machine, rotating an anvil roll, with a resilient cover mounted thereon and adapted for penetration by the die cutting rules, at a selected rotational speed different from the speed of the die holder roll thereby tending to cause the die cutting rules to penetrate the cover at sequential and circumferentially spaced locations upon successive revolutions of the anvil roll, and adding to the rotational speed of the anvil roll during substantially successive revolutions of the roll thereby causing the die cutting rules to actually penetrate the cover at sequential locations circumferentially spaced from the locations where the rules would tend to penetrate except for the addition of speed to the speed of the anvil roll.

The anvil roll may be rotated at a speed greater or lesser than the speed of the die holder roll and the result will be the same, that is, actual penetration of the cutting rules will occur at sequential locations circumferentially spaced from the locations where the rules tend to penetrate.

A hunting tooth ratio is preferably used between a pair of cooperating gears on the journal ends of the die holder and anvil rolls, such gears being used to rotate the rolls. One of the gears has one tooth less than the number of teeth that would normally be used for the particular proportions of the circumferences of the two rolls. This results in one of the rolls rotating slightly faster than the other thus causing the cutting rules to tend to penetrate the cover at sequential, spaced locations around the circumference of the anvil roll during successive rotations of the roll.

For purposes of description, it will be assumed that the gears driving the die holder and anvil rolls are nominally the same diameter but with the anvil roll gear having one less tooth than the die holder roll gear driving it. Thus, for each revolution of the die holder roll gear, the anvil roll gear will rotate one full revolution plus the circumferential distance between adjacent teeth on the anvil roll gear measured along the circular pitch line of the gear. The diameters of the rolls are proportional to the size of their associated gears so that the surface speeds of the rolls will be equal during rotation. This arrangement results in a fixed difference in rotational speed of the rolls even though their surface speeds remain the same.

Thus, it can be seen that if rotational speed is added to the anvil roll which exceeds this fixed difference, or is added to the anvil roll by an amount less than the fixed difference in speed, the result will be that the cutting rules will penetrate the cover at sequential locations circumferentially spaced from the locations where the rules tend to penetrate the cover due to the gearing ratio alone.

The anvil roll is usually reciprocated laterally along its longitudinal axis. This lineal motion can be utilized to produce rotary motion in one direction corresponding to lineal motion in one direction and to produce rotary motion in the opposite direction corresponding to lineal motion in the other direction. Such rotary motion can be used to first add to and then subtract from the rotational speed of the anvil roll thereby causing the die cutting rules to actually penetrate the cover at sequential locations circumferentially spaced in one direction from the locations where the rules tend to penetrate the cover when speed is added to the anvil roll and in the opposite direction when speed is subtracted from the speed of the anvil roll. This will result in only a minute difference between the surface speeds of the rolls which will not be enough to affect the accuracy of die cutting in the paperboard sheets passing between the rolls.

Figure 6:
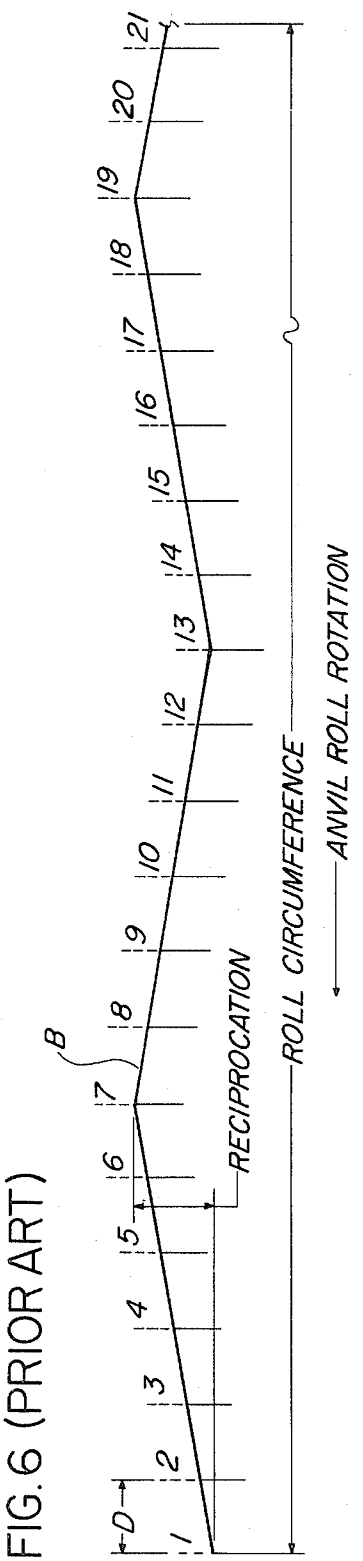
FIG. 6 (PRIOR ART)
FIG. 6 is a diagrammatic illustration showing the penetration pattern of the cutting rules produced by the use of a hunting tooth ratio as used in the prior art.

FIG. 6 is a line diagram of a portion of the penetration pattern of the cutting rules in the anvil roll cover, as viewed in a flat plane, when only a hunting tooth ratio is used as the prior art. The dashed lines 1 to 21 represent the circumferential locations around the anvil cover where laterally extending cutting rules on the die holder roll tend to penetrate the cover on the anvil roll. The solid lines directly opposite the dashed lines represent the circumferential locations around the anvil cover where the laterally extending cutting rules actually penetrate the cover. As illustrated, the solid and dashed lines coincide in the circumferential direction. The actual penetration occurs at the same location as the location where the rules tend to penetrate because rotational speed is not added to or substracted from the speed of the anvil roll. Thus, if the gear driving the die holder roll has 126 teeth and the gear driving the anvil roll has 125 teeth, then the penetration pattern will repeat when the anvil roll has made 125 revolutions. As the pattern repeats, paper fibers are packed into the preceding cuts and it will not take long for the cover to become impacted to the extend that cutting is impaired.

Figure 7:
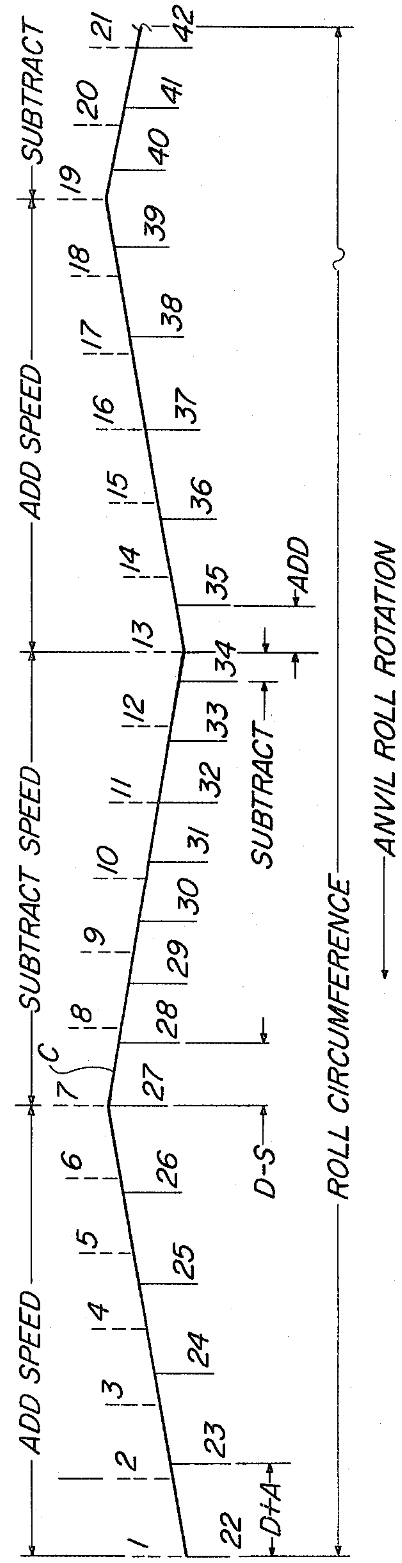
FIG. 7 is a diagrammatic illustration similar to FIG. 6 showing the penetration pattern achieved by the use of the preferred method and apparatus of the present invention.

FIG. 7 is a line diagram similar to FIG. 6 illustrating the penetration pattern provided by the present invention. The dashed lines 1 to 21 represent the circumferential locations around the anvil cover where laterally extending cutting rules on the die holder roll would normally tend to penetrate the cover on the anvil roll, the same as shown in FIG. 6. However, the solid lines 22 to 42 represent the circumferential locations around the anvil cover where the cutting rules actually penetrate the cover, utilizing the present invention. It should be understood that many more penetrations occur than are actually shown for ease of illustration. As previously mentioned, the hunting tooth ratio tends to cause penetration of the cutting rules as illustrated by the dashed lines; however, penetration does not occur at these locations because of the speed added to and subtracted from the speed of the anvil roll. Without the addition and subtraction of speed, penetration would occur at spaces equal to the distance between adjacent teeth on the gear driving the anvil roll measured along the pitch circle of the gear. For example, if six pitch spur gears are used, this distance would be 0.5236 inches as indicated by dimension D. However, rotational speed is added to the speed of the anvil roll while the roll is moving laterally in one direction thereby causing actual penetration to occur at a distance indicated by the dimension D plus A; similarly, speed is subtracted from the speed of the anvil roll while it is moving laterally in the opposite direction as indicated by the dimension D minus S. The peaks and valleys of the solid lines B and C of FIGS. 6 and 7 respectively illustrate the limits of lateral reciprocation of the anvil roll.

The main purpose of this invention is to spread the penetration pattern around the anvil roll in small increments and to prevent the pattern from repeating as often as it does with the use of a hunting tooth ratio between the gears. The apparatus of this invention, to be subsequently described, adds and subtracts speed to and from the speed of the anvil roll by a small amount. As an example, it may be designed to add and subtract speed that will result in a circumferential distance of 0.0194 inches between penetrations. Thus, while speed is added to the anvil roll, each succeeding penetration will occur at distance D (0.5236 inches) plus distance A (0.0194 inches); while speed is subtracted from the anvil roll, each succeeding penetration will occur at distance D (0.5236 inches) minus distance S (0.0194 inches). This pattern will walk around the circumference of the roll so that the next succeeding pattern will be circumferentially displaced from the first pattern by a distance of 0.0194 inches. This displacement continues until the pattern catches up to itself after which it will repeat.

FIGS. 1 to 5 illustrate the preferred apparatus of the invention. Referring now to FIG. 1, a rotary die cutter machine generally denoted by numeral 50 includes a feed section 52 for feeding sheets 54 into a rotary die cutter section 56. The feed section 52 and die cutter section 56 are conventional except for the speed changing apparatus to be subsequently described.

The feed section 52 includes a feed table 58 upon which stacks of sheets 54 are placed. The leading edges of the sheets rest against a gate assembly 60 and the trailing edges are abutted by a backstop bar 62 spanning most of the width of the machine. A feeder bar 64 is made to reciprocate along the top surface of the table 58 from beneath the backstop bar 62 which is spaced above the table 58 by a support 66. As the feeder bar 64 moves forward, its leading edge engages the trailing edge of a sheet 54 and pushes it forward in the direction of arrow 55 until the leading edge of the sheet is engaged by a pair of feed rolls 68 and 70 which advance the sheets serially into the die cutting section 56. A suitable feed mechanism is shown and described in Henry D. Ward, Jr. U.S. Pat. No. 3,588,095.

Figure 2:
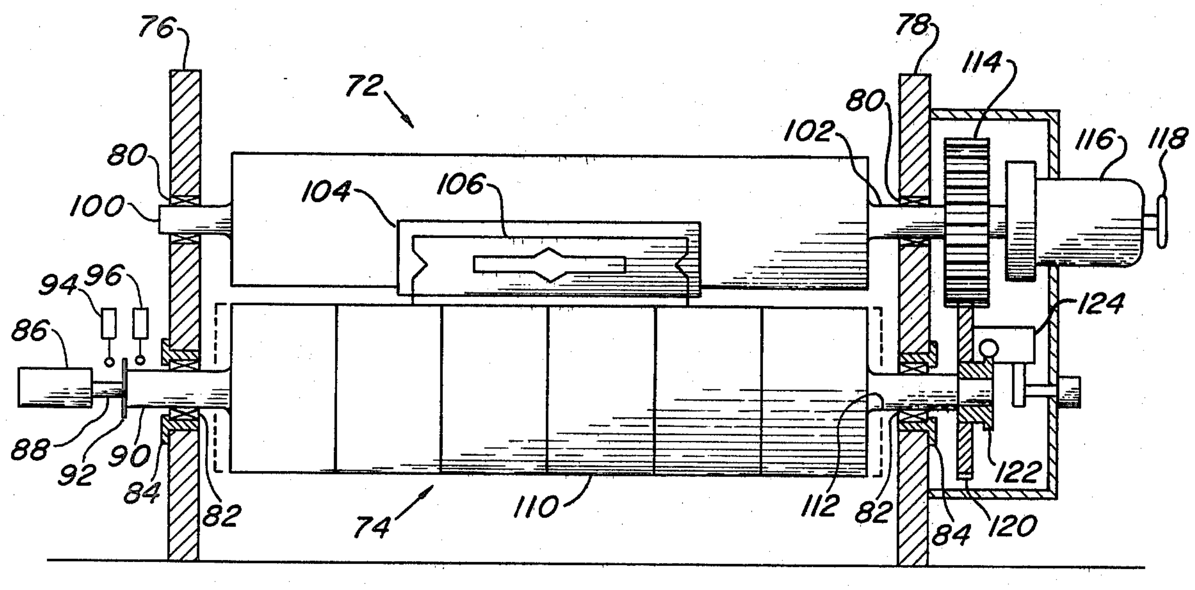
FIG. 2 is a diagrammatic illustration in cross section of the die cutting portion of the machine of FIG. 1 taken along the line II—II.

The die cutting section 56 includes an upper die holder roll assembly 72 and a lower anvil roll assembly 74 supported for rotation between a pair of laterally spaced side frames 76 and 78 (See FIG. 2). The upper roll is supported in bearings 80 in the side frames and the lower roll 74 is supported in bearings 82 in conventional eccentric housings 84 in the side frames. The eccentric housings are linked together by a cross shaft (not shown) which, when selectively rotated, rotates the eccentric housings to move the lower roll 74 closer to or farther away from the upper roll 72 to adjust the depth of penetration of die cutting rules (to be described) into a resilient cover on the lower roll.

The lower roll 74 is made to reciprocate laterally across the width of the machine as denoted by the dashed lines adjacent the end of the roll 74 in FIG. 2. This may be accomplished by use of apparatus shown and described in Ward U.S. Pat. No. 3,272,047. In essence, such apparatus includes a fluid operated cylinder 86 secured to a support (not shown) and having a reciprocable rod 88 connected to a journal end 90 of the roll 74. A plate 92 is also secured to the journal 90 and reciprocates laterally therewith as the rod 88 reciprocates the roll 74; as it does, the plate 92 strikes an electric limit switch 94 which operates a suitable valve (not shown) to direct fluid pressure to the cylinder 86 to extend the rod 88 to move the roll 74 to the right as viewed in FIG. 2. The plate 92 then strikes another limit switch 96 which operates the valve to direct fluid pressure to the cylinder 86 to retract the rod 88 thereby moving the roll 74 to the left as viewed in FIG. 2. This cyclic reciprocation continues during operation of the die cutting section and results in penetration of the cutting rules occurring at laterally displaced locations along the length of the roll 74 during rotation thereof. It should be understood that the distance between the limit switches 94 and 96 may be selectively varied to result in the desired length of the lateral reciprocation stroke. For purposes herein, the length of stroke is selected to be about 1.5 inches.

The upper roll assembly 72 is conventionally constructed from a metal tube 98 having journal ends 100 and 102. The tube portion 98 has a plurality of tapped holes therein (not shown) so that an arcuate plywood die board 104 may be bolted thereto. Die cutting rules and scoring rules 106 are secured to the die board in the conventional manner. The cutting rules are preferably serrated along their cutting edges, as is well understood by those skilled in the art, and are formed in a pattern desired for cutting the sheets 54 to such pattern as the sheets pass between the rolls 72 and 74. An example of the construction and mounting of such rules is shown and described in Martin U.S. Pat. No. 3,170,358.

The lower anvil roll assembly 74 is conventionally constructed from a metal tube 108 on which is secured an anvil cover 110 which may comprise a plurality of individual segments as shown in FIG. 2. This permits the individual segments to be relocated on the tube 108. It should be understood that most sheets 54 are narrower than the machine so that most of the die cutting occurs near the center. Thus, as the center segments wear, they may be moved to the ends of the roll and the less worn segments on the ends placed in the center. The cover segments 110 may be secured to the tube 108 as shown and described in Charles E. Smith U.S. Pat. No. 3,602,970. The roll assembly 74 also includes a journal end 112, in addition to the journal 90 previously described, for supporting the roll in bearings 82 to permit rotation and reciprocation of the roll.

As best shown in FIG. 2, the journal 102 of die holder roll 72 includes a spur tooth gear 114 mounted thereon; such gear may be driven from gears on the pull rolls 68 and 70 through an idler gear (not shown). The pull rolls may be driven by an electric motor, also not shown. A conventional electric running register 116 may also be connected to the journal 102 to rotate the roll 72 relative to the gear train to place the cutting rules 106 in register with the sheets 54 passing between the rolls 72 and 74; such register may include an end adjustment handwheel which can be turned to move the roll 72 laterally for similar registration purposes. The construction and operation of the register 116 and end adjustment 118 are well known and understood by those skilled in the art.

The gear 114 is in meshing engagement with and drives a gear 120 supported for rotation about a worm wheel 122 secured to the journal 112 for rotating the roll 74. A speed changing assembly generally denoted by numeral 124 is mounted to the side face of gear 120 for adding to and subtracting from the speed of rotation of roll 74 as will be subsequently described.

Figure 3:
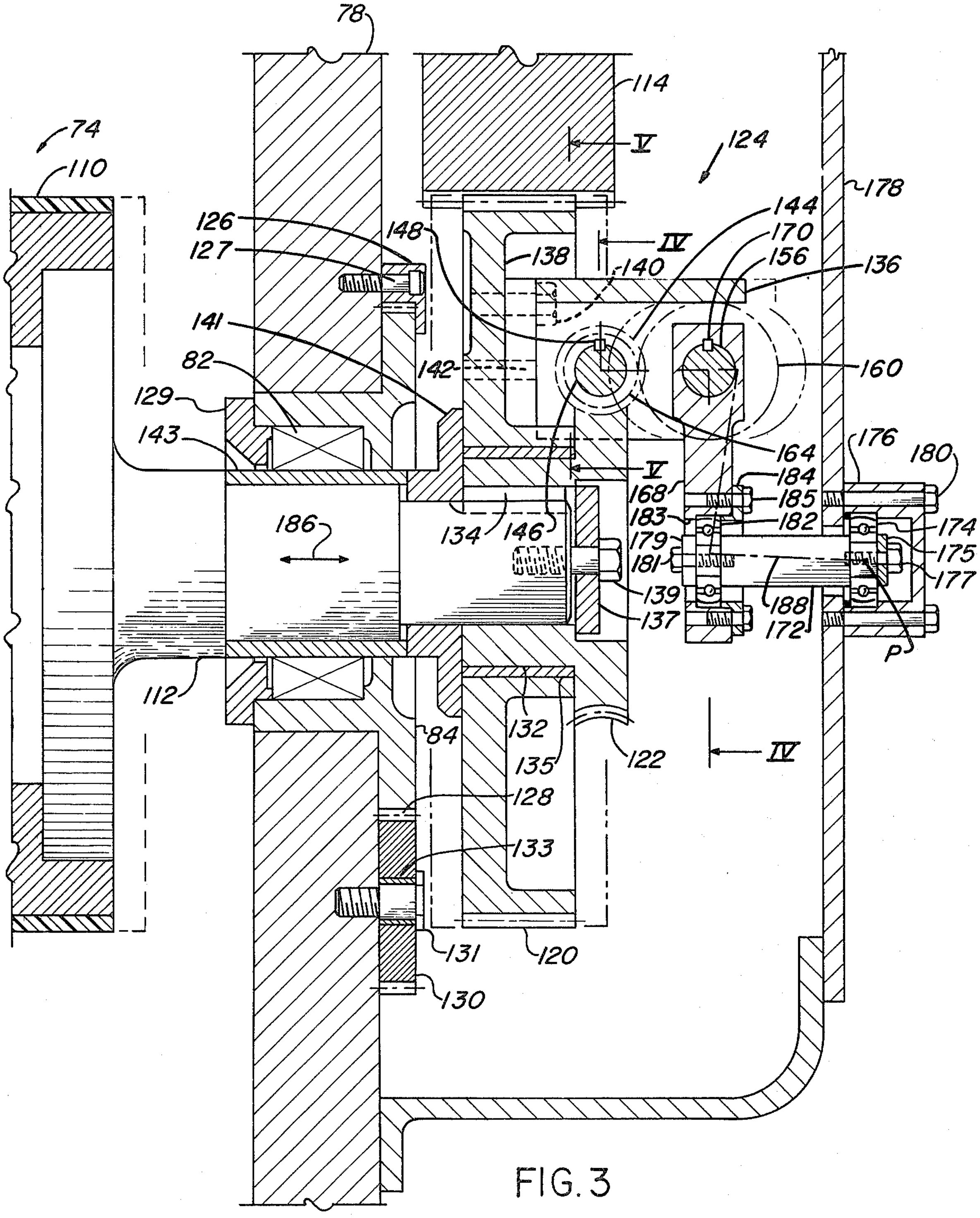
FIG. 3 is an enlarged section view of the right side end of the lower anvil roll of FIG. 2 showing the preferred apparatus of the invention.
Figure 5:
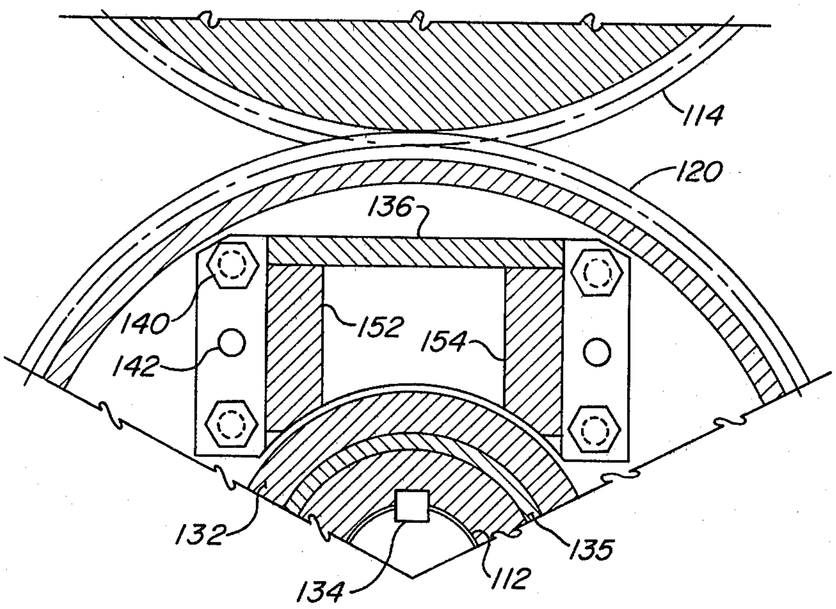
FIG. 5 is an end view of the bracket and gear mounting arrangement taken along the line V—V in FIG. 3.
Figure 4:
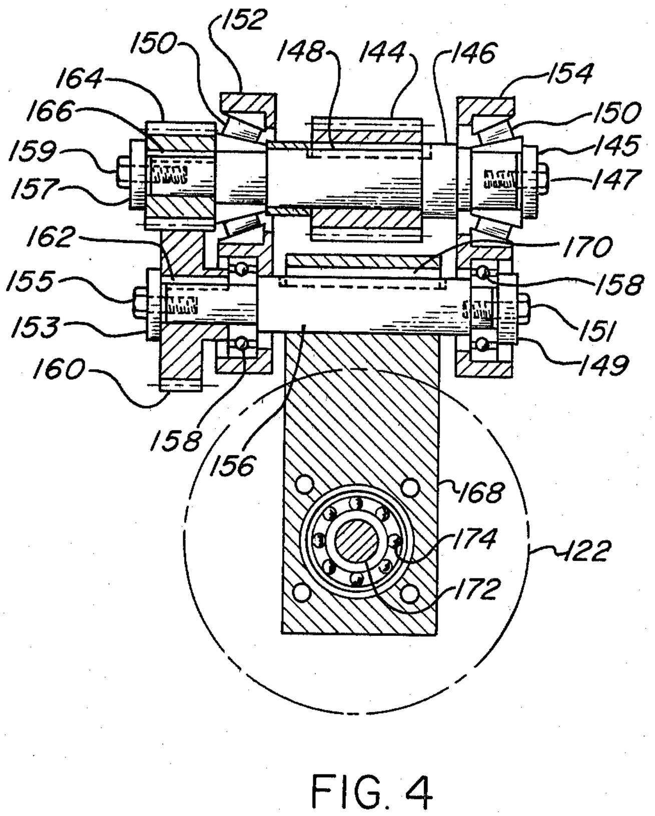
FIG. 4 is an end view of the apparatus of FIG. 3 taken along the line IV—IV.

The speed changing assembly 124 is illustrated in FIGS. 3 to 5. Referring to FIG. 3, the journal end 112 of anvil roll assembly 74 is supported in bearing 82, as previously described, with the bearing being mounted in eccentric housing 84, itself mounted in the side frame 78 and held in place by a bracket 126 held to the frame 78 by bolt 127. Bearing 82 is held in eccentric housing 84 by a collar 129 secured to the housing by bolts (not shown). The eccentric housing includes external spur gear teeth 128 in meshing engagement with similar teeth on a pinion gear 130 mounted to frame 78 by a shoulder bolt 131 passing through bushing 133. Pinion 130 can be rotated by another gear mounted on a pinion shaft (not shown) spanning the frames 76 and 78 so that, upon rotation of the pinion shaft, the eccentric housings 84 may be rotated simultaneously in the well known manner to move the anvil roll 74 closer to or farther away from the die holder roll 72 to control the depth of penetration of the cutting rules 106 in the anvil cover 110 as previously described.

The gear 120 is supported for independent rotation about a bushing 135 on hub portion 132 of worm wheel 122 so that as gear 120 is driven by gear 114, it will turn freely around the hub 132. The worm wheel 122 is secured for rotation with journal end 112 by a conventional shaft key 134 with the worm wheel 122 being held in place on the journal 112 by a washer 137 and bolt 139 as shown. A spacer ring 141 spaces the gear 120 from a hardened inner race 143 on journal 112 which slides through bearing 82.

The speed changing assembly 124 is driven by the gear 120 and it, in turn, imparts rotation to the worm wheel 122 to rotate the anvil roll 74. In this sense, the speed changing assembly 124 is connected between the gear 120 and the anvil roll 74.

More specifically, a bracket 136 is secured to a side face 138 of gear 120 by bolts 140 and locating pins 142 as shown in FIGS. 3 and 5. Bracket 136 supports a worm gear 144 secured for rotation with a stub shaft 146 by a shaft key 148, such worm gear being in meshing engagement with worm wheel 122. The stub shaft 146 is supported for rotation in bearings 150 mounted in side plates 152 and 154 of bracket 136 as shown in FIG. 4. A washer 145 and bolt 147 hold the stub shaft 146 against bearing 150 on the right side as viewed in FIG. 4.

A pinion shaft 156 is also supported for rotation in bearings 158 mounted in side plates 152 and 154 as shown in FIGS. 3 and 4. A washer 149 and bolt 151 hold the pinion shaft 156 against bearing 158 on the right side as viewed in FIG. 4. A pinion gear 160 is secured for rotation on the end of pinion shaft 156 by a shaft key 162 and is secured to the end of the shaft by a washer 153 and bolt 155 which hold the gear 160 against bearing 158 as shown in FIG. 4. Pinion gear 160 is in meshing engagement with another pinion gear 164 secured for rotation on the end of stub shaft 146 by a shaft key 166; the pinion gear 164 is held on the end of stub shaft 146 by a washer 157 and bolt 159 and against bearing 150.

A pivot lever 168 surrounds the pinion shaft 156 between side plates 152 and 154, such pivot lever being keyed to the pinion shaft by a shaft key 170. The opposite end of the pivot lever 168 is pivotably connected to a substantially fixed connection in coaxial alignment with the end of the anvil roll journal 112 as best shown in FIG. 3. The connection includes a pivot shaft 172 with a conventional self-aligning bearing 174 secured to the right end thereof as viewed in FIG. 3. The bearing 174 is held in fixed coaxial alignment with journal end 112 by housing 176; the housing 176 is secured to a gear guard member 178 by bolts 180. A washer 175 and bolt 177 hold bearing 174 on pivot shaft 172. Another self-aligning bearing 182 is secured to the opposite end of pivot shaft 172 by washer 179 and bolt 181. Bearing 182 is also held against a shoulder 183 in the end of pivot lever by a bearing retainer 184 bolted to the lever by bolts 185 thereby connecting the pivot lever 168 to the pivot shaft 172. The self-aligning bearings permit the pivot shaft to pivot about point P and, in addition, permit the pivot lever 168 to rotate about the left end of pivot shaft 172 as viewed in FIG. 3.

In operation, gear 114 on the journal end 102 of the die holder roll 72 rotates gear 120 on the journal end 112 of the anvil roll 74. Gear 120 is free to rotate around the hub 132 of worm wheel 122 and thus does not directly drive the anvil roll 74. Gear 120 has one tooth less than gear 114 thereby providing a hunting tooth ratio that causes the gear 120 to rotate slightly faster than gear 114. As gear 120 rotates, it carries the bracket 136, and the parts supported by the bracket, with it. Consequently, the pivot lever 168 rotates around the pivot shaft 172. As the gear 120 rotates, the anvil roll 74 simultaneously reciprocates in the lateral direction as indicated by arrow 186. This causes the gear 120, bracket 136, and the upper end (as viewed in FIG. 3) of the pivot lever 168 to reciprocate; the dashed lines in FIG. 3 show the reciprocable movement of these parts which are shown in mid-position by the solid lines. Since the lower end of the pivot lever 168 is restrained against lateral motion, it pivots around the bearing 182 on the end of pivot shaft 172. As the lever 168 pivots, it causes the pinion shaft 156 to rotate slightly in an arc since the lever is keyed to the shaft; and, since the bracket moves horizontally during reciprocation, the pivot shaft 172 will pivot upwardly about point P in the position shown in FIG. 3. The centerlines of the pivot shaft 172, the pivot lever 168, and the bracket are shown by the phantom line 188 when the bracket is reciprocated to its extreme right position as viewed in FIG. 3. The arc rotation of the pinion shaft 156 rotates pinion gear 160 in an arc also since the gear is keyed to the shaft. This in turn rotates pinion gear 164 since it is in mesh with gear 160. Since gear 164 is keyed to the stub shaft 146, the worm gear 144, also keyed to the stub shaft, will also rotate slightly in an arc. As it does, it rotates the worm wheel 122, with which it is in mesh, which rotates the journal end 112 to which it is keyed thereby rotating the anvil roll 74. It should be understood that the bracket 136 rotates with gear 120, carrying the worm gear 144 in mesh with the worm wheel 122 with it so that the worm wheel 122 turns the journal 112 at the speed of rotation of the gear 120; that is, if there were no reciprocation of the anvil roll 74, the roll would still be rotated at the speed of rotation of the gear 120. As already explained, this rotation displaces the penetration of the cutting rules 106 in the cover 110 by distance D as shown in FIG. 6. Thus, the rotation of worm wheel 122 caused by the arc rotation of the worm gear 144 is added to the rotation of the worm wheel 122 as it is carried around by the bracket 136.

From the foregoing it can be seen that as the anvil roll 74 reciprocates in the opposite direction, the pivot lever 168 will move in the opposite direction thereby rotating the pinion gear 160 in an arc in the opposite direction. This, of course, rotates the worm wheel 122, through the previously described gears, in the opposite direction so that speed is subtracted from the speed of rotation of the anvil roll. Thus, it can be seen that the speed changing assembly 124 adds rotational speed to the anvil roll 74 as the roll reciprocates in one direction and subtracts speed from the anvil roll when it reciprocates in the opposite direction. It should be understood that the proportions of the worm wheel 122, worm gear 144, and the associated pinion gears, as well as the length of the pivot lever 168, and, if desired, the length of the stroke of anvil roll reciprocation, can be made to add and subtract speed to and from the anvil roll an amount to provide a desired amount of circumferential displacement of the penetration pattern on the anvil roll. However, it is believed that these parts should be proportioned to provide a circumferential displacement range of about one circumferential pitch of gear 120 so as to produce a substantially even cut pattern in anvil cover 110.

In summary, the die holder roll 72 with the die cutting rules 106 thereon is rotated at a selected speed, such as the speed of the machine; the anvil roll 74 is rotated at a selected rotational speed different from the speed of the die holder roll 72, caused by the use of a hunting tooth ratio between the gears 114 and 120, which tends to cause the rules 106 to penetrate the cover 110 at sequential circumferentially spaced locations around the cover upon successive revolutions of the anvil roll; and the speed changing means 124 adds rotational speed to the speed of the anvil roll 74 during substantially successive revolutions of the anvil roll, while the anvil roll is reciprocating in one direction, which causes the cutting rules to actually penetrate the cover at sequential locations circumferentially spaced from the locations where the cutting rules tend to penetrate the cover because of the circumferential displacement caused by the hunting tooth ratio between the gears 114 and 120. Conversely, the speed changing assembly 124 subtracts from the speed of the anvil roll 74 when it reciprocates in the opposite direction.

It should be understood that the direction of reciprocation of the anvil roll 74 changes abruptly at the end of the stroke because of the operation of the limit switches 94 and 96 and associated valves (not shown) and, therefore, the speed added to or subtracted from the speed of the anvil roll 74 will change upon successive revolutions of the anvil roll. However, the anvil roll 74 may be reciprocated by other means such as, for example, a crank mechanism which would, from its very nature, cause reciprocation to occur at a variable velocity which would appear substantially as a sine wave. In this event, the speed changing assembly 24 would not add to or subtract from the speed of the anvil roll, at least by very much, as the roll approached zero velocity at the ends of the sine wave velocity curve. Accordingly, it can be said that speed is added to or subtracted from the speed of the anvil roll during substantially successive revolutions of the anvil roll.

It should also be understood that the speed changing assembly 124 as described herein adds to and subtracts from the rotational speed of the anvil roll 74 by an amount less than the speed difference caused by the use of a hunting tooth ratio. However, the various gears in the speed changing assembly may be proportioned to add to and subtract from the speed of the anvil roll by an amount greater than the difference in speed caused by the hunting tooth ratio. In this event, the result will still be the same, that is, actual penetration will occur at locations spaced circumferentially from the locations where the cutting rules tend to penetrate.

Thus, the invention having been described in its best embodiment and mode of operation, that which is desired to be claimed by Letters Patent is:

1. Apparatus for extending the useful life of a resilient cover on an anvil roll for a rotary die cutter comprising in combination:

a die holder roll, having die cutting rules mounted thereon, rotatable at a first selected speed;

a laterally reciprocable anvil roll, having said resilient cover thereon adapted for penetration by said die cutting rules, including a first gear associated therewith and driven by a second gear on said die holder roll, rotatable at a second selected speed different from said first selected speed of said die holder roll tending to cause said die cutting rules to penetrate said cover at first sequential circumferentially spaced locations upon successive revolutions of said anvil roll; and speed changing means including gear means, connected between said first gear and said anvil roll, operable in response to lateral reciprocation of said anvil roll for adding to and subtracting from the speed provided by said first gear to add to and subtract from the speed of said anvil roll an amount less than the difference between said first and second selected speeds causing said die cutting rules to actually penetrate said cover at a second different location circumferentially spaced from said first different location upon substantially successive revolutions of said anvil roll.

2. The apparatus of claim 1 wherein said speed changing means includes:

gear means, connected between said first gear and said anvil roll, operable in response to lateral reciprocation of said anvil roll for adding to and subtracting from the speed provided by said first gear to add to and subtract from the speed of said anvil roll an amount greater than the difference between said first and second selected speeds causing said die cutting rules to actually penetrate said cover at a second different location circumferentially spaced from said first different location upon substantially successive revolutions of said anvil roll.

3. The apparatus of claim 1 wherein said gear means includes;

a pivot means having a first end pivotable about a substantially fixed connection; and a second end pivotable in response to said lateral reciprocation of said anvil for imparting rotation to a pivot gear carried thereon, said pivot gear being operably connected to said anvil roll to add to the speed of rotation thereof when said anvil roll laterally reciprocates in a first direction and to subtract from the speed of rotation thereof when said anvil roll laterally reciprocates in a second direction.

4. The apparatus of claim 1 wherein:

said first gear is mounted for independent rotation about a journal on the end of said anvil roll; and said gear means includes:

a worm wheel connected for rotation with said journal;

a bracket secured to a side face of said first gear and rotatable therewith, said bracket supporting a worm gear in meshing engagement with said worm wheel and supporting a first pinion gear operably connected to said worm gear, said bracket also supporting a pinion shaft with a second pinion gear secured thereto in meshing engagement with said first pinion gear; and a pivot lever having a first end pivotably connected to a substantially fixed connection located in coaxial alignment with said journal and adjacent an end thereof, said pivot lever being rotatable about said fixed connection and having a second end keyed to said pinion shaft, said anvil roll being laterally reciprocable a selected distance, such reciprocation operable for moving said first gear with said bracket thereon in a first direction toward said fixed connection and then in an opposite direction away from said fixed connection, such reciprocation pivoting said pivot lever about said fixed connection and causing said second end of said pivot lever to rotate said pinion shaft with said second pinion gear theron through an arc during reciprocation of said anvil roll thereby rotating said first pinion gear, said worm wheel, and said journal during reciprocation thereof to first add to and then subtract from the rotation of said anvil roll relative to the speed of said first gear during rotation of said first gear and said anvil roll.

* * * * *